US011190941B2

United States Patent
Lamb et al.

(10) Patent No.: US 11,190,941 B2
(45) Date of Patent: Nov. 30, 2021

(54) TRAFFIC AND THREAT CLASSIFICATION FOR SHORT-RANGE WIRELESS CHANNELS

(71) Applicant: Bastille Networks, Inc., Atlanta, GA (US)

(72) Inventors: Logan Michael Lamb, Atlanta, GA (US); Sebastian Balint Seeber, San Francisco, CA (US)

(73) Assignee: Bastille Networks, Inc., Atlanta, GA (US)

( * ) Notice: Subject to any disclaimer, the term of this patent is extended or adjusted under 35 U.S.C. 154(b) by 0 days.

(21) Appl. No.: 16/412,411

(22) Filed: May 14, 2019

(65) Prior Publication Data

US 2020/0367061 A1 Nov. 19, 2020

(51) Int. Cl.
*H04W 12/12* (2021.01)
*H04W 12/122* (2021.01)
*H04W 24/08* (2009.01)
*H04W 4/80* (2018.01)
*H04L 12/26* (2006.01)

(52) U.S. Cl.
CPC ....... *H04W 12/122* (2021.01); *H04L 43/0882* (2013.01); *H04W 4/80* (2018.02); *H04W 24/08* (2013.01)

(58) Field of Classification Search
CPC ....... H04W 74/00; H04W 24/08; H04W 4/80; H04W 12/1206
See application file for complete search history.

(56) References Cited

U.S. PATENT DOCUMENTS

| | | | | |
|---|---|---|---|---|
| 7,475,244 B2 * | 1/2009 | Sugikawa | ............. | H04L 61/301 713/168 |
| 10,567,948 B1 * | 2/2020 | Baxley | ................. | H04B 1/0003 |
| 2008/0031184 A1 * | 2/2008 | Seo | ..................... | H04M 1/7253 370/328 |
| 2010/0074112 A1 * | 3/2010 | Derr | ........................ | H04L 41/12 370/232 |
| 2012/0327816 A1 * | 12/2012 | Morrill | ............. | H04M 15/8016 370/259 |

(Continued)

*Primary Examiner* — Jeffrey C Pwu
*Assistant Examiner* — Mayasa A. Shaawat
(74) *Attorney, Agent, or Firm* — Eversheds Sutherland (US) LLP (57) ABSTRACT

Systems and methods can support identifying threats in short-range wireless communications, such as Bluetooth, using one or more radio frequency sensors to receive signals transmitted between a master device and a slave device. Packets can be identified within the received signals and designated as originating from the master device or from the slave device. The wireless interface can be identified as synchronous or asynchronous. Lengths of data may be identified for data payloads within the packets. Total aggregate data lengths may be calculated for both the master and the slave transmissions. Time slot utilization statistics can be computed. A connection type category may be determined using these wireless connection features. The connection type may be for peripherals, streaming audio, two-way headsets, object exchange, data tethering, and so forth. Potential security threats associated with the wireless interface may be identified from the determined connection type and from the wireless connection features.

20 Claims, 8 Drawing Sheets

(56) References Cited

U.S. PATENT DOCUMENTS

2017/0243009 A1* 8/2017 Sejpal ................... G06F 21/577
2019/0207954 A1* 7/2019 Ahuja ................. H04L 63/0236
2020/0252162 A1* 8/2020 Denboer ................ H04L 1/189

* cited by examiner

TRAFFIC AND THREAT CLASSIFICATION FOR SHORT-RANGE WIRELESS CHANNELS

BACKGROUND

Short-range wireless data technologies are increasingly used to replace cables or wired interconnects between computers, peripherals, tablets, smartphones, stereos, and other electronic devices. Examples of short-range wireless technologies include Bluetooth, Wireless USB, Z-Wave, ZigBee, and other personal area network (PAN) solutions. Security features integral to these widely deployed wireless channels generally encrypt, or otherwise obfuscate, transmitted data payloads. This complicates the challenge of identifying threats or malicious operations using these technologies, particularly within the enterprise or similar environments.

There is a need in the art for traffic analysis and threat classification in short-range wireless channels where these functions can operate on wireless packets having encrypted payloads without decrypting the payload data.

SUMMARY

In certain example embodiments described herein, methods and systems can support identifying security threats in short-range wireless communications using one or more radio frequency sensors to receive signals transmitted between a master device and a slave device. Packets can be identified within the received signals and designated as originating from the master device or from the slave device. The wireless interface can be identified as synchronous or asynchronous. Lengths of data may be identified for data payloads within the packets. Total aggregate data lengths may be calculated for both the master and the slave transmissions. Time slot utilization statistics can be computed. A connection type category may be determined using these wireless connection features. The connection type may be for peripherals, streaming audio, two-way headsets, object exchange, data tethering, and so forth. Potential security threats associated with the wireless interface may be identified from the determined connection type and from the wireless connection features.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable classification and threat analysis for short-range wireless communication technologies. One or more radio sensors can collect radio signals associated with short-range wireless technologies, such as Bluetooth, Wireless USB, Z-Wave, ZigBee, or other personal area network (PAN) solutions. Data payloads in short-range wireless communication technologies may be encrypted. Without decrypting the actual traffic being transmitted, the technology presented herein can analyze various features of the wireless signal to identify the type of wireless traffic and assess potential security threats. Examples of traffic classification may include grouping connections into peripheral links (for example, mice and keyboards), streaming audio links (for example, speakers and headphones), two-way hands-frees headset links, object exchange (OBEX) transfers, and tethering. Various traffic features, even encrypted traffic, along with traffic classifications, may be used to identify potential security threats associated with short-range wireless communications.

Certain examples of wireless security threat can exploit data tethering. Tethering can be used for data exfiltration. Even if the data on an enterprise network is protected from access from outside of the network, an employee may use tethering on their mobile phone to allow access to the data or to transmit it outside of the secured network.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
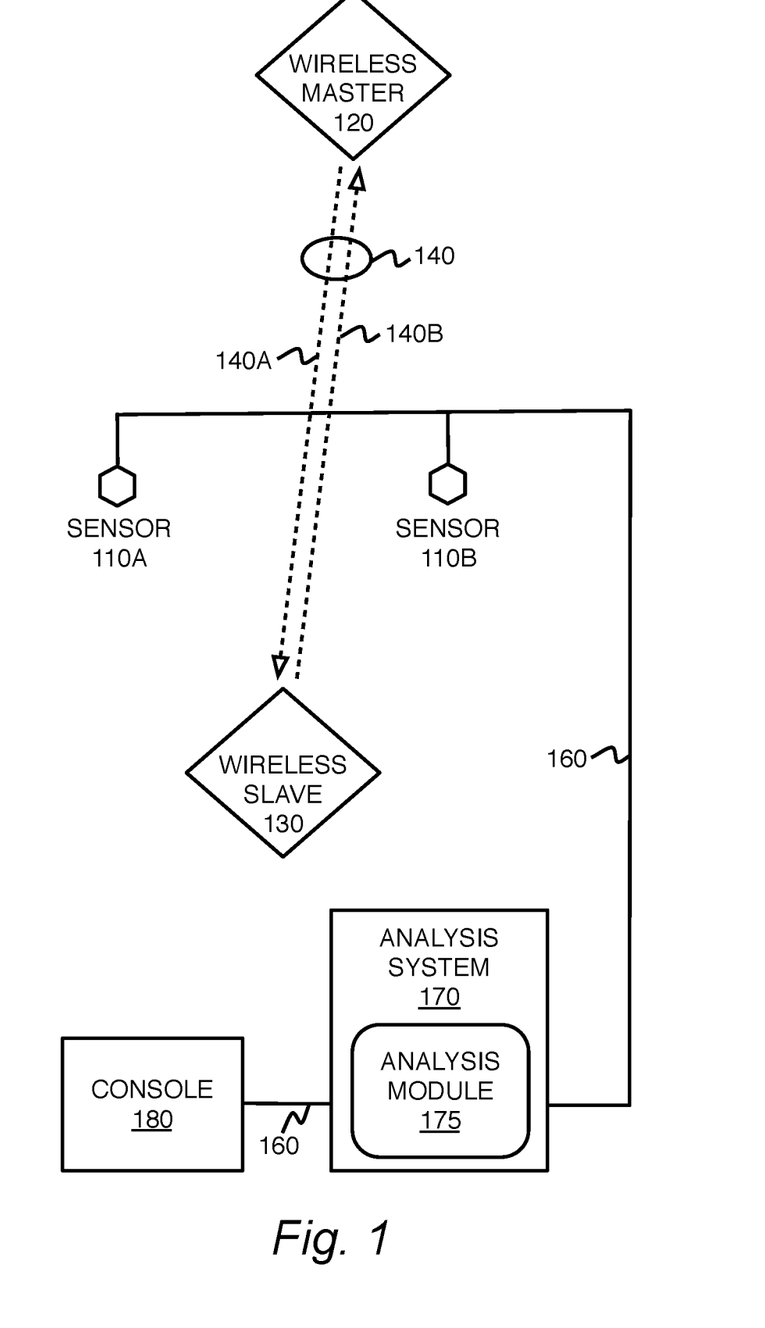
FIG. 1 is a block diagram depicting an electromagnetic environment, sensor, and analysis system in accordance with one or more embodiments presented herein.

FIG. 1 is a block diagram depicting an electromagnetic environment, sensor, and analysis system in accordance with one or more embodiments presented herein. Wireless radio frequency sensors 110A-110B can collect, digest, analyze, and relay radio frequency signals comprising short-range wireless communications 140 between wireless master devices 120 and wireless slave devices 130. The short-range wireless communications 140 can comprise master transmissions 140A from the wireless master device 120 to the wireless slave device 130 as well as slave transmissions 140B from the wireless slave device 130 to the wireless master device 120. The short-range wireless communications 140 can comprise short-range wireless technologies such as Bluetooth, Wireless USB, Z-Wave, ZigBee, or other personal area network (PAN) solutions.

Examples of wireless master devices 120 may include microcomputers, smartphones, tablets, computers, hot spots, embedded computing devices, wireless infrastructure, or various other computing machines. Examples of the wireless slave device 130 may include any devices wirelessly linked to the wireless master devices 120 such as peripherals, mice, keyboards, printers, mobile devices, speakers, headsets, wearable devices, access control systems, sensors, safety devices, physical security components, access control, HVAC controls, building infrastructure, communication devices, and so forth. One or multiple wireless master devices 120 may communicate with one or multiple wireless slave device 130 in various combinations. For example, using Bluetooth, one wireless master device 120 may generally communicate with up to seven wireless slave devices 130, although far more connections may be parked for future use.

The sensors 110A-110B may be referred to, in general or collectively, as sensors 110 or a sensor 110. The sensors 110 may collect electromagnetic signals from one or more antennas over a wide bandwidth of radio frequencies. The sensors 110 may utilize hardware-defined radio receivers or software-defined radio receivers. According to various embodiments, these radio receivers can convert received radio frequency energy into digital signals. These digital signals can then be decoded into encoded data streams and processed according to various technologies presented herein. The signal data collected by the sensors 110 may be transmitted to the analysis system 170 for processing. These signals or related signal data may be communicated in a continuous fashion or in one or more batches, at particular intervals according to various embodiments.

While hardware-defined radio receivers can be cost-effective and less complex to implement, they may be limited as to what type of encoded data streams they can detect from the electromagnetic environment. For example, a hardware Bluetooth receiver module or chipset is generally not able to also receive Wi-Fi radio signals. In contrast, software-defined radio receivers can much more flexibly receive and decode various data streams within the electromagnetic environment under software control. Software-defined radio receivers can support analyzing wide bands of radio spectrum, which can be useful in short-range wireless technologies such as Bluetooth where pseudorandom hopping over 79 channels could make the monitoring of radio channels quite a challenge. Similarly, software-defined radio receivers can support a diverse variety of data rates, modulation schemes, and control protocols that may be used in short-range wireless technologies such as Bluetooth.

The analysis system 170 can receive and process signals from the sensors 110. One or more analysis modules 175 may support operation of the analysis system 170. The analysis system 170 may perform, among other functions, receiving packets, aggregating packets, associating packets, master/slave identification, determining packet lengths, calculating aggregated data transfer for a wireless connection, evaluating packet utilization for a wireless connection, classifying wireless connection types, assessing threat characteristics for a wireless connection, characterization of wireless device users, localization of wireless devices, and various other types of signal processing and analysis.

The console 180 and various associated operator interfaces can support configuring, controlling, or reviewing analysis results associated with the analysis system 170. The console 180 can provide visualization features for use by system or security administrators to monitor the electromagnetic environment for wireless security usage and security threats. Such visualizations may include displays about the area under observation including device type, device position, estimates of the data throughput being transmitted by devices, attack types being perpetrated, victim devices, and so forth. The operator interfaces may comprise interfaces associated with one or more visualization consoles 180, one or more administrative user interface applications, or various other user or system interfaces associated with the technology presented herein.

The console 180 can provide a user interface for security personnel or system administrators to obtain visibility into operations of the analysis system 170 and determinations about the various wireless master device 120 and wireless slave device 130 engaging in short-range wireless communications 140 based upon analysis of the electromagnetic environment. The analysis system 170 may localize, monitor, record, and playback the position and activity of the various short-range wireless devices 120, 130 including suspected rogue, unauthorized, or malicious devices. A system administrator, or other user, may use the console 180 to discover, localize, and otherwise analyze a malicious short-range wireless devices 120, 130 operating within an enterprise or other facility. The administrator may be provided with a visualization of the position of the short-range wireless devices 120, 130 in the environment. The visualization may include metadata for each of the short-range wireless devices 120, 130. For each given short-range wireless devices 120, 130, the metadata may include physical layer specifications such as modulation, protocols, master/slave status, traffic classification, symbol rates, bandwidths, or frequencies; a likelihood metric that the device is rogue, unauthorized, or malicious; a type of attack, if any, being employed by the device; and other short-range wireless devices 120, 130 that the particular device is likely to be communicating with.

The networks 160 may interconnect some or all of the sensors 110, the analysis system 170, and the console 180. Portions of the networks 160 connecting the sensors 110 may be configured to transmit radio frequency signals and/or digital information. Radio frequency signals may be communicated as collected, down-converted using an intermediate frequency oscillator, or down-converted to baseband. Communication links associated with the networks 160 may use various physical media such as twisted pair, coaxial cable, or fiber optic cables. The signals transferred on the physical media may be analog RF, radio over fiber, digital, packetized, switched, connection-oriented, or any combination thereof. According to various embodiments, the communication links associated with the networks 160 may use wireless frequencies or transmission paths that are selected to avoid interference from or to the electromagnetic environment in use by the short-range wireless devices 120, 130.

Figure 8:
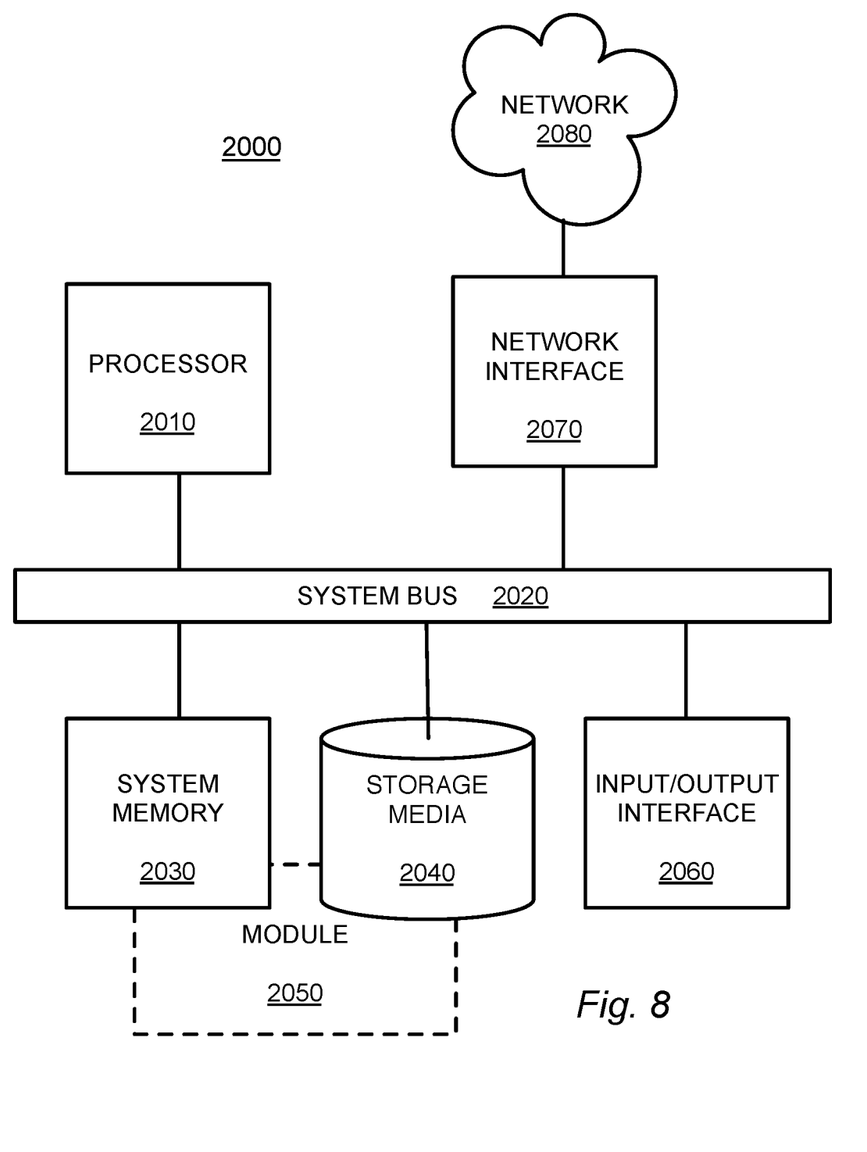
FIG. 8 is a block diagram depicting a computing machine and a module in accordance with one or more embodiments presented herein.

The wireless master devices 120, wireless slave devices 130, sensors 110, signal analysis system 170, console 180, or any other systems associated with the technology presented herein may be any type of computing machine such as, but not limited to, those discussed in more detail with respect to FIG. 8. Furthermore, any modules associated with any of these computing machines, such as the analysis module 175, or any other modules (scripts, web content, software, firmware, or hardware) associated with the technology presented herein may be any of the modules discussed in more detail with respect to FIG. 8. The devices and computing machines discussed herein may communicate with one another as well as other computer machines or communication systems over one or more networks such as network 160. The network 160 may include any type of data or communications links or network technology, including any of the network technology, discussed with respect to FIG. 8.

Figure 2:
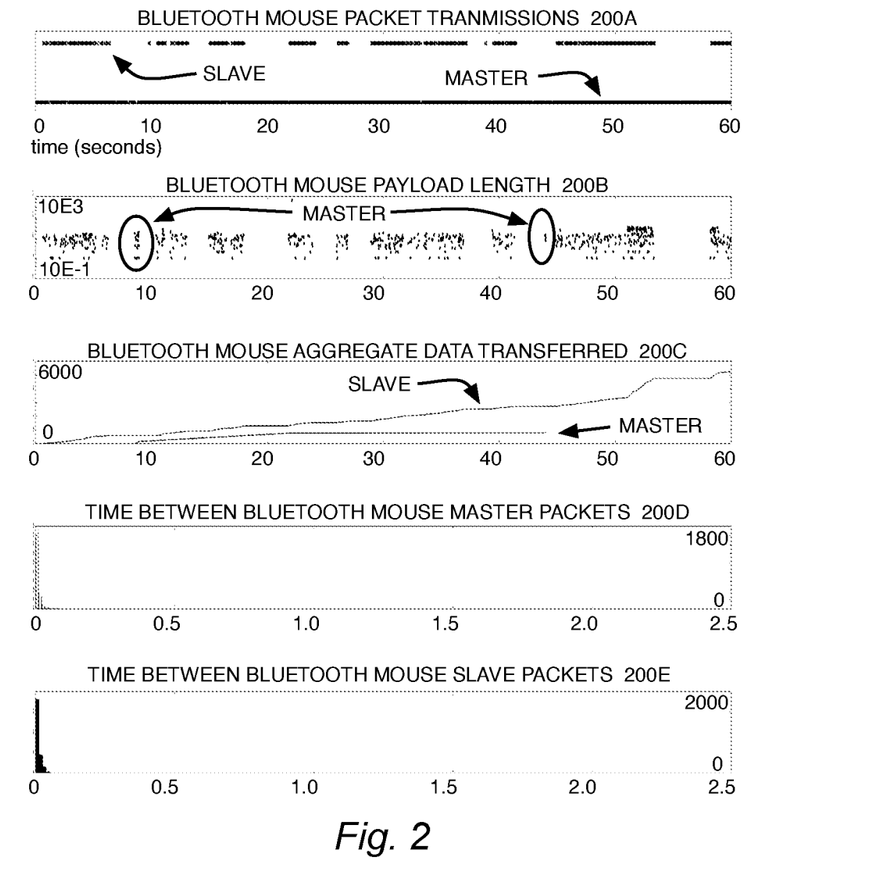
FIG. 2 is a data collection and analysis diagram illustrating short-range wireless mouse communications in accordance with one or more embodiments presented herein.

FIG. 2 is a data collection and analysis diagram illustrating short-range wireless mouse communications in accordance with one or more embodiments presented herein. Five plots depict Bluetooth mouse packet transmissions 200A over time, Bluetooth mouse payload length 200B, Bluetooth mouse aggregate data transferred 200C over time, time between Bluetooth mouse master packets 200D, and time between Bluetooth mouse slave packets 200E. In this configuration, the wireless slave device 130 is a mouse peripheral and the wireless master device 120 is a microcomputer using the mouse peripheral as a user input device.

The plot depicting Bluetooth mouse packet transmissions 200A over time has time in seconds on the horizontal axis. The plot depicting Bluetooth mouse packet transmissions 200A shows master transmission 140A packets from the wireless master device 120 to the wireless slave device 130 and it also shows slave transmission 140B packets from the wireless slave device 130 to the wireless master device 120. The plot depicting Bluetooth mouse packet transmissions 200A shows fairly continuous transmissions by both the wireless master device 120 and the wireless slave device 130. This pattern may be due to a keep-alive heartbeat exchange as part of the communication protocol between the wireless slave device 130 and the wireless master device 120.

The plot depicting Bluetooth mouse payload length 200B has packet length in bytes (shown on a logarithmic scale) on the vertical axis and time in seconds on the horizontal axis. The plot depicting Bluetooth mouse payload length 200B shows that most of the longer packets are from the wireless slave device 130 (mouse) and fewer are from the wireless master device 120 (microcomputer). This pattern may be due to the mouse returning position, motion, scrolling, and button click information while the microcomputer may only transmit simple queries and acknowledgements.

The plot depicting Bluetooth mouse aggregate data transferred 200C over time has total data in bytes on the vertical access and time in seconds on the horizontal axis. As discussed above, most of the longer packets are from the wireless slave device 130 (mouse) and fewer are from the wireless master device 120 (microcomputer). Accordingly, the aggregated total data from the wireless slave device 130 (mouse) increases more rapidly than from the wireless master device 120 (microcomputer).

Both the time between Bluetooth mouse master packets 200D and the time between Bluetooth mouse slave packets 200E show low times between packets since the illustrated mode of communication between the mouse and microcomputer involves frequent and consistent communications back and forth.

Figure 3:
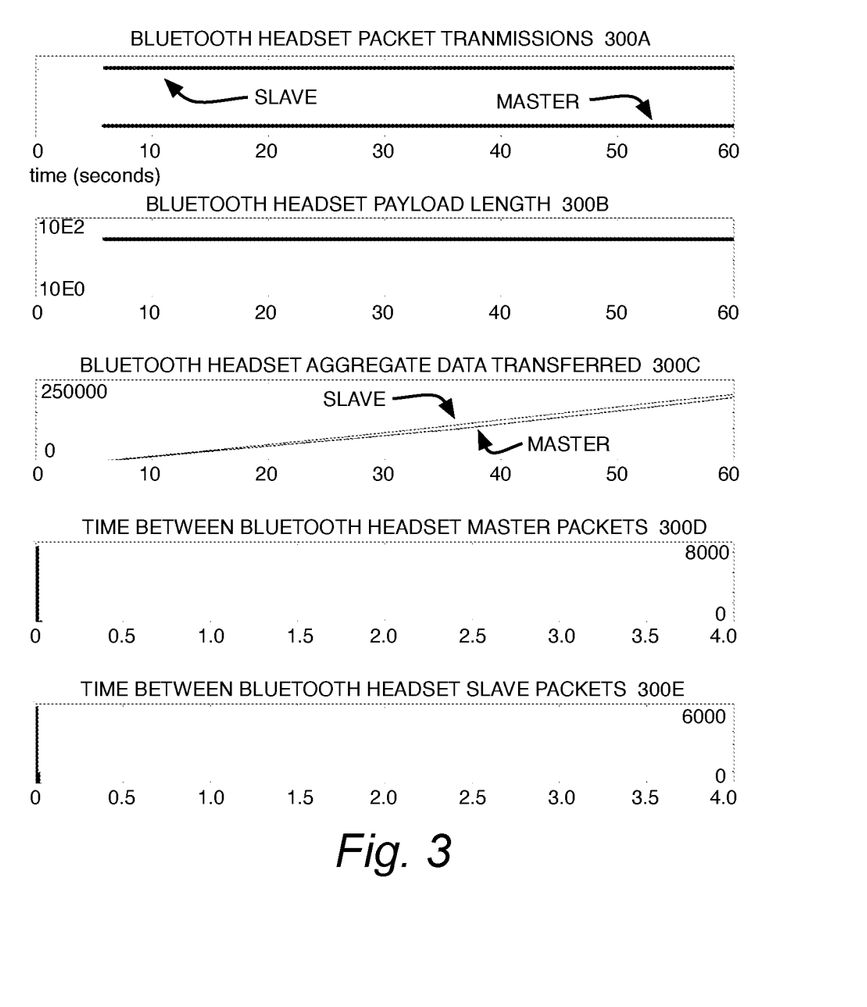
FIG. 3 is a data collection and analysis diagram illustrating short-range wireless headset communications in accordance with one or more embodiments presented herein.

FIG. 3 is a data collection and analysis diagram illustrating short-range wireless headset communications in accordance with one or more embodiments presented herein. Five plots depict Bluetooth headset packet transmissions 300A over time, Bluetooth headset payload length 300B, Bluetooth headset aggregate data transferred 300C over time, time between Bluetooth headset master packets 300D, and time between Bluetooth headset slave packets 300E. In this configuration, the wireless slave device 130 is a wireless headset peripheral, for example, the type used to place hands-free telephone calls. The wireless master device 120 may be a mobile telephone, smartphone, or microcomputer using the wireless headset to deliver audio to a user's ear and also to input audio from the user via a microphone.

The plot depicting Bluetooth headset packet transmissions 300A over time has time in seconds on the horizontal axis. The plot depicting Bluetooth headset packet transmissions 300A shows master transmission 140A packets from the wireless master device 120 to the wireless slave device 130, and it also shows slave transmission 140B packets from the wireless slave device 130 to the wireless master device 120. The plot depicting Bluetooth headset packet transmissions 300A shows fairly continuous transmissions by both the wireless master device 120 and the wireless slave device 130. The plot depicting Bluetooth headset packet transmissions 300A over time also depicts a feature that can be discovered specifically for wireless hands-free headset traffic. There are starts and stops to the transmissions indicating call origination time and call termination time from which call duration or call occurrence patterns can be determined.

The plot depicting Bluetooth headset payload length 300B has packet length in bytes (shown on a logarithmic scale) on the vertical axis and time in seconds on the horizontal axis. The plot depicting Bluetooth headset payload length 300B shows almost the same length and quantity of packets from the wireless slave device 130 (headset) as from the wireless master device 120 (mobile telephone). This pattern may be due to the audio stream to the wireless headset and the audio stream from the audio headset having very similar data rates. The two streams may be the same sample rate and bandwidth. The transmission of sampled audio data packets is bidirectional for a hands-free telephone headset.

The plot depicting Bluetooth headset aggregate data transferred 300C over time has total data in bytes on the vertical access and time in seconds on the horizontal axis. As discussed above, the longer packets from the wireless slave device 130 (headset) and those from the wireless master device 120 (mobile telephone) are nearly identical. Accordingly, the aggregated total data from the wireless slave device 130 (headset) increases over time at a very similar rate as that from the wireless master device 120 (mobile telephone).

Both the time between Bluetooth headset master packets 300D and the time between Bluetooth headset slave packets 300E show low times between packets since the illustrated mode of communication between the headset and mobile telephone involves frequent and consistent communications back and forth.

Figure 4:
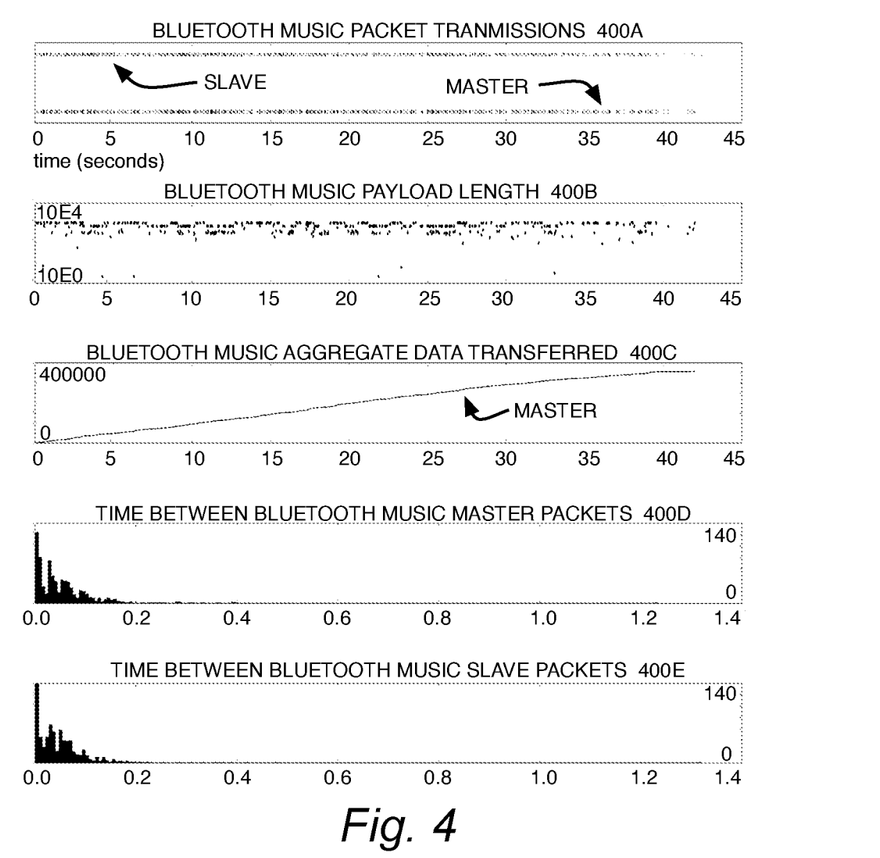
FIG. 4 is a data collection and analysis diagram illustrating short-range wireless music communications in accordance with one or more embodiments presented herein.

FIG. 4 is a data collection and analysis diagram illustrating short-range wireless music communications in accordance with one or more embodiments presented herein. Five plots depict Bluetooth music packet transmissions 400A over time, Bluetooth music payload length 400B, Bluetooth music aggregate data transferred 400C over time, time between Bluetooth music master packets 400D, and time between Bluetooth music slave packets 400E. In this configuration, the wireless slave device 130 is a wireless music peripheral, for example, a speaker or earphones. The wireless master device 120 may be a mobile telephone, smartphone, or microcomputer using the wireless speaker or earphones to deliver an audio stream.

The plot depicting Bluetooth music packet transmissions 400A over time has time in seconds on the horizontal axis. The plot depicting Bluetooth music packet transmissions 400A shows master transmission 140A packets from the wireless master device 120 to the wireless slave device 130 and it also shows slave transmission 140B packets from the wireless slave device 130 to the wireless master device 120. The plot depicting Bluetooth music packet transmissions 400A shows transmissions by both the wireless master device 120 and the wireless slave device 130.

The plot depicting Bluetooth music payload length 400B has packet length in bytes (shown on a logarithmic scale) on the vertical axis and time in seconds on the horizontal axis. The plot depicting Bluetooth music payload length 400B shows almost entirely packets from the wireless master device 120 (audio stream source) to the wireless slave device 130 (speaker or earphones). This pattern may be due to the music audio stream from the source being delivered to the wireless speaker or earphones with significantly less data in the other direction from the wireless slave device 130 (speaker or earphones) back to the wireless master device 120.

The plot depicting Bluetooth music aggregate data transferred 400C over time has total data in bytes on the vertical access and time in seconds on the horizontal axis. As discussed above, the longer sampled music data packets are substantially transmitted from the wireless master device 120 and directed to wireless slave device 130 (speaker or earphones). Accordingly, the aggregated total data from the wireless master device 120 increases over time far more rapidly than aggregated total data from the wireless slave device 130.

Both the time between Bluetooth music master packets 400D and the time between Bluetooth music slave packets 400E show relatively low times between packets since the illustrated mode of communication between the headset and mobile telephone involves relatively frequent and consistent communications back and forth.

Figure 5:
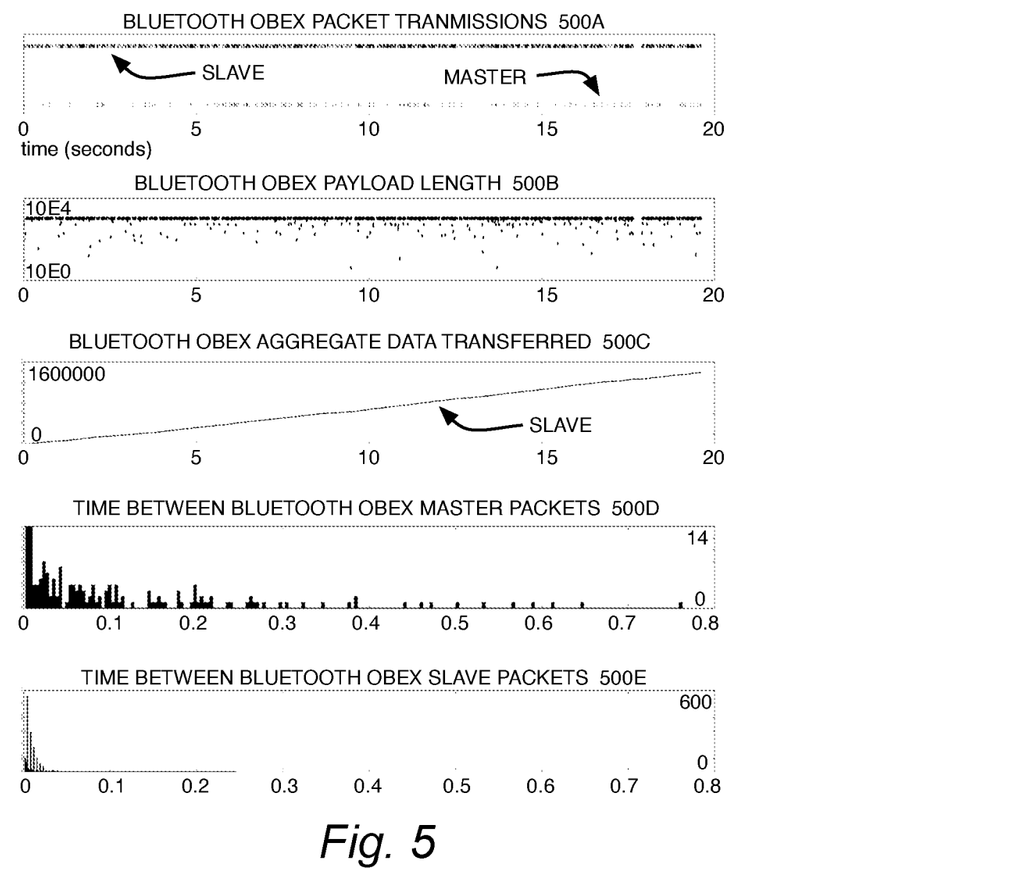
FIG. 5 is a data collection and analysis diagram illustrating short-range wireless OBEX communications in accordance with one or more embodiments presented herein.

FIG. 5 is a data collection and analysis diagram illustrating short-range wireless OBEX communications in accordance with one or more embodiments presented herein. Object Exchange (OBEX) is a data protocol for exchanging binary data objects between devices. OBEX may be used in a similar fashion as hypertext transfer protocol (HTTP) supporting a client to connect to a server where it may provide or request binary data objects. Five plots depict Bluetooth OBEX packet transmissions 500A over time, Bluetooth OBEX payload length 500B, Bluetooth OBEX aggregate data transferred 500C over time, time between Bluetooth OBEX master packets 500D, and time between Bluetooth OBEX slave packets 500E. In this configuration, the wireless slave device 130 is connecting to the wireless master device 120 and exchanging data via OBEX. In such an example, both the wireless slave device 130 and the wireless master device 120 may be any combination of mobile devices, smartphones, peripherals, computing machines, microcomputers, or other such data-oriented devices.

The plot depicting Bluetooth OBEX packet transmissions 500A over time has time in seconds on the horizontal axis. The plot depicting Bluetooth OBEX packet transmissions 500A shows master transmission 140A packets from the wireless master device 120 to the wireless slave device 130 and it also shows slave transmission 140B packets from the wireless slave device 130 to the wireless master device 120. The plot depicting Bluetooth OBEX packet transmissions 500A shows transmissions by both the wireless master device 120 and the wireless slave device 130, with a larger number of transmissions originating from the wireless slave device 130.

The plot depicting Bluetooth OBEX payload length 500B has packet length in bytes (shown on a logarithmic scale) on the vertical axis and time in seconds on the horizontal axis. The plot depicting Bluetooth OBEX payload length 500B shows almost entirely packets from the wireless slave device 130 (OBEX client) to the wireless master device 120 (OBEX server). This pattern may be due to the OBEX client (the wireless slave device 130) sending data objects to the OBEX server (the wireless master device 120).

The plot depicting Bluetooth OBEX aggregate data transferred 500C over time has total data in bytes on the vertical access and time in seconds on the horizontal axis. As discussed above, the longer sampled OBEX data packets are substantially transmitted from the wireless slave device 130 and directed to wireless master device 120. Accordingly, the aggregated total data from the wireless slave device 130 increases over time far more rapidly than aggregated total data from the wireless master device 120.

Both the time between Bluetooth OBEX master packets 500D varies more broadly than the time between Bluetooth OBEX slave packets 500E which shows relatively low times between packets.

Figure 6:
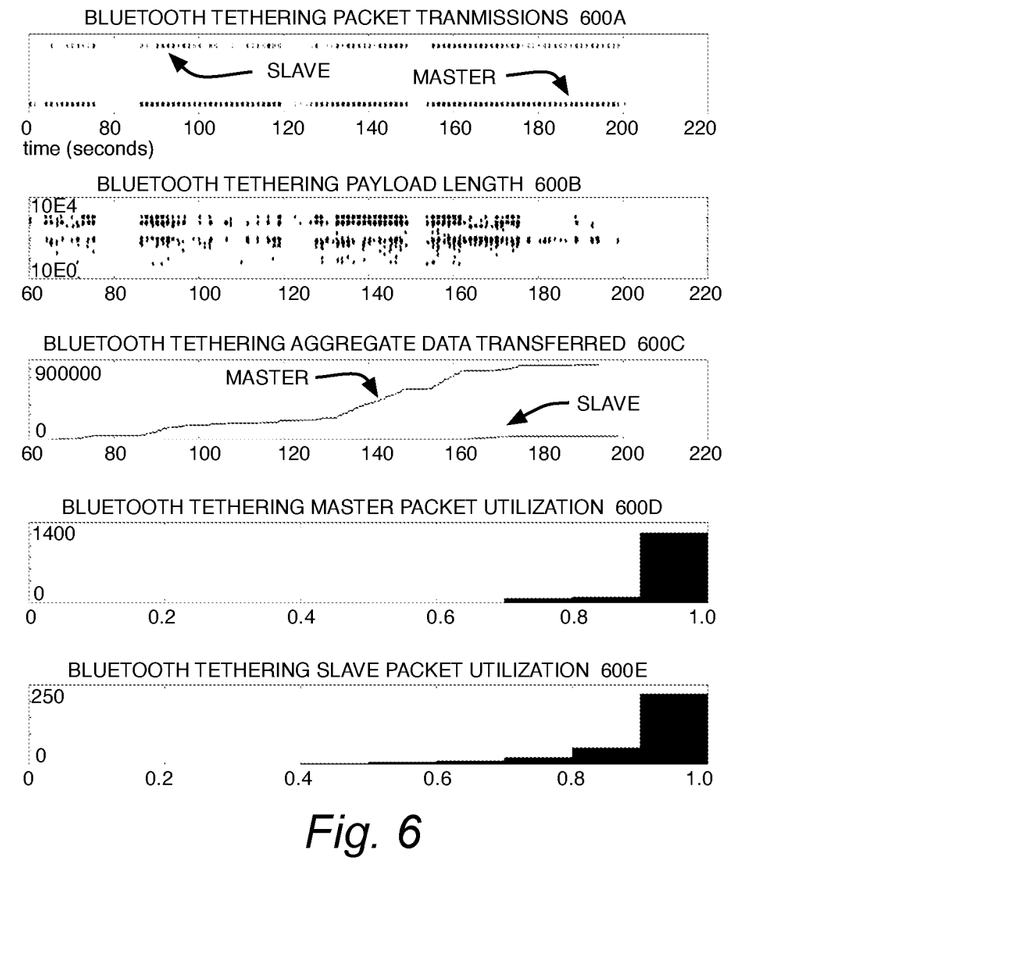
FIG. 6 is a data collection and analysis diagram illustrating short-range wireless tethering communications in accordance with one or more embodiments presented herein.

FIG. 6 is a data collection and analysis diagram illustrating short-range wireless tethering communications in accordance with one or more embodiments presented herein. Tethering, at least in this example, is where the wireless slave device 130 tethers to the wireless master device 120 so that the wireless slave device 130 can access another network or system, often the Internet, through the wireless master device 120. The illustrated data is from tethering within a Personal Area Network. Five plots depict Bluetooth tethering packet transmissions 600A over time, Bluetooth tethering payload length 600B, Bluetooth tethering aggregate data transferred 600C over time, Bluetooth tethering master packet utilization 600D, and Bluetooth tethering slave packet utilization 600E. In this configuration, both the wireless slave device 130 and the wireless master device 120 may be any combination of mobile devices, smartphones, peripherals, computing machines, microcomputers, or other such data-oriented devices.

The plot depicting Bluetooth tethering packet transmissions 600A over time has time in seconds on the horizontal axis. The plot depicting Bluetooth tethering packet transmissions 600A shows master transmission 140A packets from the wireless master device 120 to the wireless slave device 130 and it also shows slave transmission 140B packets from the wireless slave device 130 to the wireless master device 120. The plot depicting Bluetooth tethering packet transmissions 600A shows transmissions by both the wireless master device 120 and the wireless slave device 130, with a larger number of transmissions originating from the wireless master device 120.

The plot depicting Bluetooth tethering payload length 600B has packet length in bytes (shown on a logarithmic scale) on the vertical axis and time in seconds on the horizontal axis. The plot depicting Bluetooth tethering payload length 600B shows a mixture of packets from the wireless slave device 130 and from the wireless master device 120, with a larger number of transmissions originating from the wireless master device 120. This pattern may be due to the tethering client (the wireless slave device 130) pulling more data from the tethering server (the wireless master device 120).

The plot depicting Bluetooth tethering aggregate data transferred 600C over time has total data in bytes on the vertical access and time in seconds on the horizontal axis. As discussed above, the larger number of longer tethering packets are substantially transmitted from the wireless master device 120 and directed to wireless slave device 130. Accordingly, the aggregated total data from the wireless master device 120 increases over time far more rapidly than aggregated total data from the wireless slave device 130.

The plot depicting the Bluetooth tethering master packet utilization 600D and the plot depicting the Bluetooth tethering slave packet utilization 600E indicate the ratio of the packet capacity being utilized. These are expressed as a histogram. Packet utilization, according to this example, may be computed from observed packet length divided by maximum packet length for the packet type. For example, while tethering, a lot of data is being transferred, so a high percentage (total ratio) of the allowed packet space may be used. Accordingly, the histograms illustrated in the plots 600D, 600E are heavily weighted towards 1.0, or full utilization. In Bluetooth, each packet may comprise 1, 3, or 5 timeslots of 625 microseconds each. The more packets that use a greater number of timeslots is a similar indication that the wireless connection is attempting to move a lot of data (for example tethering). Moving a large volume of data can be an indication of a data exfiltration attack or other malicious event of concern to security or threat awareness.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 7:
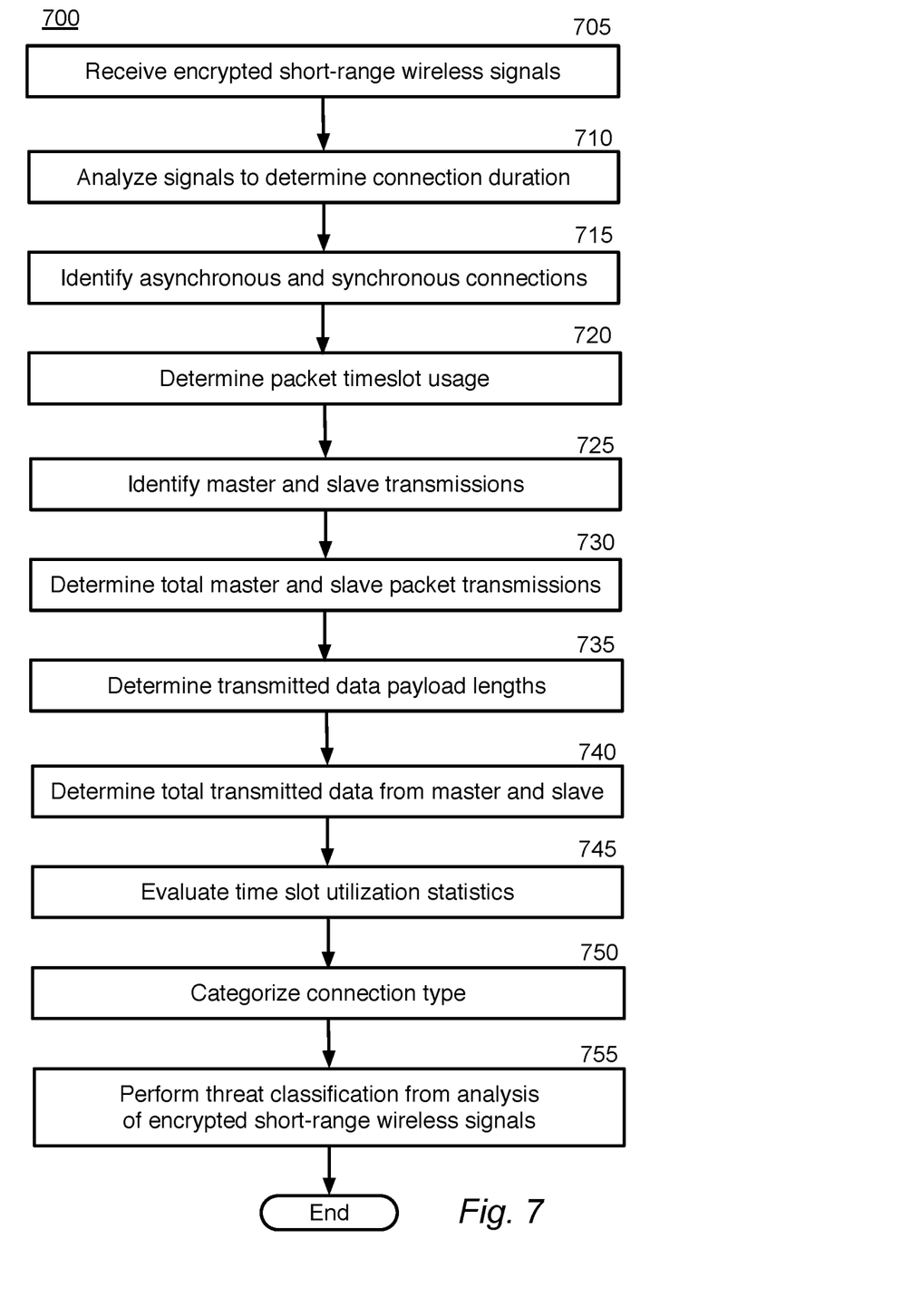
FIG. 7 is a block flow diagram depicting a method for traffic analysis and threat classification in short-range wireless channels in accordance with one or more embodiments presented herein.

FIG. 7 is a block flow diagram depicting a method 700 for traffic analysis and threat classification in short-range wireless channels in accordance with one or more embodiments presented herein. In block 705, one or more radio frequency sensors 110 may collect radio frequency signals associated with short-range wireless communications 140. While the techniques presented herein may be applied to signals collected by one radio frequency sensor 110, multiple spatially distributed sensors 110 can improve results.

In block 710, the collected signals can be analyzed to determine connection duration. This analysis may be performed at the sensor module 310 and/or at the analysis system 170. Wireless connections that start and stop at certain durations can indicate certain types of traffic. For example, wireless telephone headsets engage and disengage according to the initiation and termination times of phone calls.

In block 715, signals can be analyzed to differentiate asynchronous and synchronous connections. Wireless connections using asynchronous or synchronous communications can indicate certain types of traffic. For example, synchronous traffic is often used for wireless telephone headsets, while tethering data is generally asynchronous.

In block 720, the received signals can be analyzed to determine timeslot usage. Timeslot utilization may be related to the number of timeslots used for each packet. For example, each Bluetooth packet may comprise 1, 3, or 5 timeslots of 625 microseconds each. The more packets that use a greater number of timeslots can be a simple indication that the wireless connection is attempting to move a lot of data (for example tethering). A large amount of data being transferred can require a higher percentage of the allowed timeslots being used for data transmissions.

In block 725, wireless transmissions can be analyzed to differentiate master and slave transmissions among the monitored signals. Identifiers within received packets can be used to determine if the associated transmission is a master transmission 140A packet from a wireless master device 120 or a slave transmission 140B packet from a wireless slave device 130.

In block 730, wireless transmissions can be analyzed to determine total numbers of packet transmissions from the master and the slave. The quantity and pattern of packets transacted between the wireless master device 120 and the wireless slave device 130 may be used to classify the type of traffic handled by the connection and thus the connection type.

In block 735, wireless transmissions can be analyzed to determine the lengths of transmitted data payloads. This analysis may consider data packets only and not include control packets. Evaluating the respective lengths of master transmission 140A packets and slave transmission 140B packets may be used to classify the type of traffic handled by the connection and thus the connection type.

In block 740, wireless transmissions can be analyzed to determine total aggregate data transmitted from the wireless master device 120 and the wireless slave device 130 participating in a short-range wireless connection. Evaluating the quantity of total aggregate data transmitted by master transmission 140A packets and by slave transmission 140B packets can be used to classify the type of traffic handled by the connection and thus the connection type.

In block 745, time slot utilization statistics may be evaluated for data packets transmitted by the wireless master device 120 and by the wireless slave device 130. Time slot utilization may be calculated based on the packet length divided by the maximum packet length for that packet type. The more packets that use a greater percentage of their maximum payload capacity may be an indicator of attempting to move a lot of data (for example while tethering). A large amount of data being transferred can require a higher percentage of the maximum data payload space.

In block 750, short-range wireless communications 140 may be categorized according to connection type. The short-range wireless communication 140 connection may be grouped into categories such as peripheral links (for example, mice and keyboards), streaming audio links (for example, speakers and headphones), two-way hands-frees headset links, object exchange (OBEX) transfers, and tethering.

In block 755, information security threats may be identified and classified through the analysis of encrypted short-range wireless signals. Evaluating the master transmission 140A packets and the slave transmission 140B packets for various traffic features, even while the data payloads may remain encrypted, can lead to identification of potential security threats associated with the short-range wireless communications 140.

The information security threats identified and classified through the analysis of encrypted short-range wireless signals may be communicated to the console 180. The console 180 can provide a user interface for security personnel or system administrators to obtain visibility into operations of the analysis system 170 and determinations about the various wireless master device 120 and wireless slave device 130 engaging in short-range wireless communications 140 based upon analysis of the electromagnetic environment.

Example Systems

FIG. 8 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for identifying threats in short-range wireless communications, comprising:
    positioning one or more radio frequency sensors within an electromagnetic environment where a master wireless device and a slave wireless device share a short-range wireless communication interface;
    receiving, at the one or more radio frequency sensors, signals transmitted between the master wireless device and the slave wireless device;
    identifying packets within the received signals;
    identifying packets as originating from the master wireless device or from the slave wireless device;
    determining, from timing associated with the identified packets, that the wireless communications interface is synchronous or asynchronous;
    determining lengths of data payloads within the identified packets;
    calculating total data transmitted from the master wireless device;
    calculating total data transmitted from the slave wireless device;
    calculating time slot utilization statistics;

determining a connection type category for the wireless communications interface based upon two or more short-range wireless connection features, wherein the short-range wireless connection features comprise: the wireless communications interface being synchronous or asynchronous, the lengths of data payloads, the total data transmitted from the master wireless device, the total data transmitted from the slave wireless device, and the time slot utilization statistics;

identifying the connection type category as one of a peripheral link, a streaming audio link, a two-way headset link, an object exchange link, or a tethering link;

classifying one or more security threats associated with the wireless communications interface based upon the identified connection type and the short-range wireless connection features; and presenting the classified security threats to an operator console.

2. The method of claim 1, wherein the short-range wireless communication interface is a Bluetooth interface.

3. The method of claim 1, wherein the short-range wireless communication interface is one of a wireless USB interface, a ZigBee interface, and a personal area network interface.

4. The method of claim 1, wherein the short-range wireless connection features further comprise a number of time slots used by each of the identified packets.

5. The method of claim 1, wherein the time slot utilization statistics comprise a proportion of the payload length to the maximum payload length for each of the identified packets.

6. The method of claim 1, wherein classifying one or more security threats comprises classification of a data exfiltration threat in response to increased time slot utilization statistics.

7. The method of claim 1, wherein the short-range wireless connection features comprise identification with a specific user persona.

8. The method of claim 1, wherein data payload associated with the short-range wireless connection remains encrypted.

9. The method of claim 1, wherein classifying one or more security threats is carried out without decrypting encrypted data payloads associated with the short-range wireless connection.

10. The method of claim 1, wherein receiving signals comprises leveraging software defined radio to support multiple modulation schemes and multiple data rates.

11. A system for identifying wireless security threats, comprising:
one or more sensor antennas;
one or more radio frequency sensors configured to receive signals associated with a short-range wireless communication interface between a master wireless device and a slave wireless device; and
a signal analysis system comprising one or more processing units, and one or more processing modules configuring the one or more processing units to:
identify packets within the received signals;
identify packets as originating from the master wireless device or from the slave wireless device;
determine, from timing associated with the identified packets, that the wireless communications interface is synchronous or asynchronous;
determine lengths of data payloads within the identified packets;
calculate total data transmitted from the master wireless device;
calculate total data transmitted from the slave wireless device;
calculate time slot utilization statistics;
determine a connection type category for the wireless communications interface based upon two or more short-range wireless connection features, wherein the short-range wireless connection features comprise: the wireless communications interface being synchronous or asynchronous, the lengths of data payloads, the total data transmitted from the master wireless device, the total data transmitted from the slave wireless device, and the time slot utilization statistics;

identify the connection type category as one of a peripheral link, a streaming audio link, a two-way headset link, an object exchange link, or a tethering link;

classify one or more security threats associated with the wireless communications interface based upon the identified connection type and the short-range wireless connection features; and present the one or more classified security threats to an operator console.

12. The system of claim 11, wherein the short-range wireless communication interface is a Bluetooth interface.

13. The system of claim 11, wherein the short-range wireless communication interface is one of a wireless USB interface, a ZigBee interface, and a personal area network interface.

14. The system of claim 11, wherein the short-range wireless connection features further comprise a number of time slots used by each of the identified packets.

15. The system of claim 11, wherein the time slot utilization statistics comprise a proportion of the payload length to the maximum payload length for each of the identified packets.

16. The system of claim 11, wherein classifying one or more security threats comprises classification of a data exfiltration threat in response to increased time slot utilization statistics.

17. The system of claim 11, wherein data payload associated with the short-range wireless connection remains encrypted.

18. The system of claim 11, wherein classifying one or more security threats is carried out without decrypting encrypted data payloads associated with the short-range wireless connection.

19. The system of claim 11, wherein the one or more radio frequency sensors comprise software defined radio receivers operable to support multiple modulation schemes and multiple data rates.

20. A system for identifying wireless security threats, comprising:
one or more radio frequency sensors comprising antennas and software-defined radio receivers; and
a signal analysis system comprising one or more processing units, and one or more processing modules configuring the one or more processing units to:
receive radio frequency signals, at the one or more radio frequency sensors, associated with a Bluetooth communication interface between a master wireless device and a slave wireless device;
identify packets within the received signals;
identify packets as originating from the master wireless device or from the slave wireless device;
determine, from timing associated with the identified packets, that the wireless communications interface is synchronous or asynchronous;

determine lengths of data payloads within the identified packets;
calculate total data transmitted from the master wireless device;
calculate total data transmitted from the slave wireless device;
calculate a number of time slots utilized by each of the identified packets;
determine a connection type category for the Bluetooth communication interface based upon two or more Bluetooth connection features, wherein the Bluetooth connection features comprise: the Bluetooth communication interface being synchronous or asynchronous, the lengths of data payloads, the total data transmitted from the master wireless device, the total data transmitted from the slave wireless device, and the number of time slots utilized;
identify the connection type category as one of a peripheral link, a streaming audio link, a two-way headset link, an object exchange link, or a tethering link;
classify one or more security threats associated with the Bluetooth communication interface based upon the identified connection type and the short-range wireless connection features; and
present the one or more classified security threats to an operator console.

\* \* \* \* \*